United States Patent [19]
Burgess

[11] 3,719,080
[45] March 6, 1973

[54] SENSOR PROBE AND SHIELD ASSEMBLY FOR SWIRL-TYPE FLOWMETER

[75] Inventor: Thomas H. Burgess, Horsham, Pa.
[73] Assignee: Fischer & Porter Co., Warminster, Pa.
[22] Filed: June 7, 1971
[21] Appl. No.: 150,278

[52] U.S. Cl. ................................................73/194 B
[51] Int. Cl. ...........................G01f 1/00, G01p 5/00
[58] Field of Search................................73/194, 204

[56] References Cited

UNITED STATES PATENTS 3,279,251  10/1966  Chanaud................................73/194
3,246,515  4/1966  Martino..................................73/204

Primary Examiner—Charles A. Ruehl
Assistant Examiner—Herbert Goldstein
Attorney—Michael Ebert

[57] ABSTRACT

A swirl-type flowmeter whose output frequency is a function of fluid-flow rate. The inlet section of the meter flow tube is provided with a set of fixed swirl blades which impart a swirling motion to incoming fluid, the swirling fluid being caused to precess in an enlarged section of the tube. The precessional motion is detected by a thermistor probe and shield assembly to produce voltage pulses whose frequency depends on flow rate. This assembly is constituted by a probe extending transversely into the tube and supporting a bead-type thermistor at a point adjacent to the inner wall of the tube. Surrounding the probe and the thermistor is the upper end portion of an elongated tubular shield whose lower end portion has an access port therein which is oriented to capture a small sample of the precessing fluid and to conduct it in the direction of the thermistor to a discharge port beyond the thermistor, whereby the thermistor is responsive to the precessional motion but is otherwise effectively isolated from the mass of fluid flowing through the tube and from destructive particles borne by the fluid.

7 Claims, 4 Drawing Figures

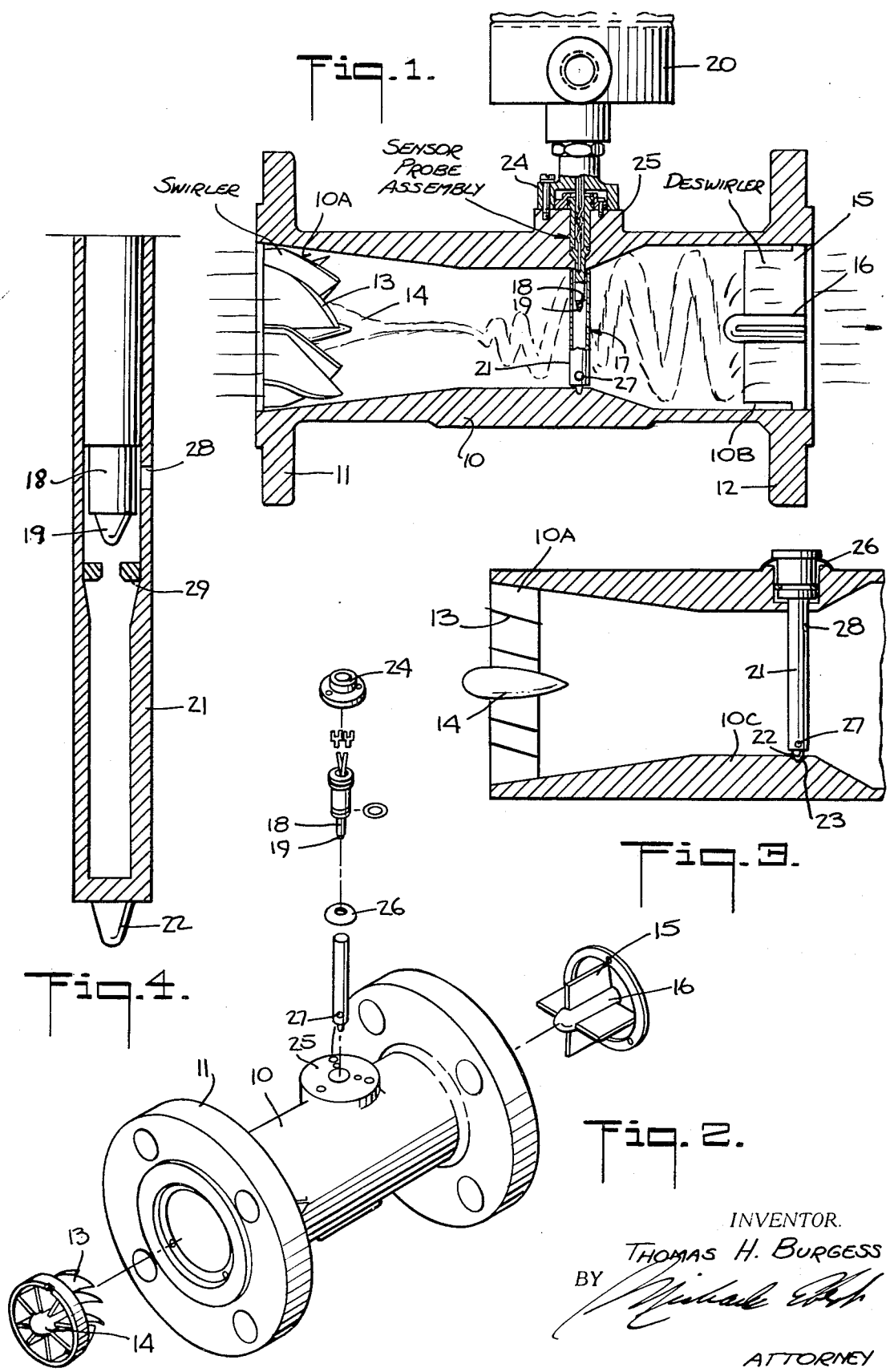

SENSOR PROBE AND SHIELD ASSEMBLY FOR SWIRL-TYPE FLOWMETER

BACKGROUND OF THE INVENTION

This invention relates generally to swirl-type flowmeters, and in particular to an improved sensor probe assembly for a flowmeter of this type, the assembly including a shield to protect the sensor element and to enhance the signal to noise ratio of the system.

A new type of volumetric flowmeter is disclosed in the article of Rodely et al., entitled, "A Digital Flowmeter Without Moving Parts," published in 1965 by the American Society of Mechanical Engineers (8 Apr. 1965 - WA/FM6). This swirl-type flowmeter currently being manufactured by the Fischer and Porter Company of Warminster, Pa. under the trademark, "Swirlmeter," and is described in their Instruction Bulletin 10S1000. Meters of this type are also described in U.S. Pat. Nos. 3,279,251; 3,314,289; and Re. 26,410, among others.

In a Swirlmeter, a homogeneous fluid whose flow rate is to be measured, is forced to assume a swirl component. This is accomplished by feeding the fluid into the inlet section of a flow tube having a fixed set of swirl blades therein which imparts a swirling motion to the fluid passing therethrough. Downstream of the swirl blades in the tube is a Venturi section which first constricts and then expands the flow passage to transform the swirling motion into precessional movement in the expanding region of the Venturi section to create a vortex.

Precession takes place about the central axis of the flow tube at a discrete frequency that is a function of the volumetric flow rate. De-swirl blades in the outlet section of the flow tube serve to straighten out the fluid leaving the meter. Cyclic variations in local fluid velocity occurring by reason of precession, are detected to provide electrical pulses whose frequency is measured to provide an indication of flow rate.

In commercially available Swirlmeters, detection of the cyclic variations is effected by means of a sensor probe mounted in the body of the meter transversely with respect to the longitudinal axis of the meter in the area where the vortex precession is near the inner wall of the flow tube. At the tip of the sensor probe is a thermistor which serves to detect the frequency of precession. A thermistor is a solid-state device made of a semi-conducting oxidic material that exhibits a high negative temperature coefficient of resistivity whereby the resistance of the device increases rapidly with decreasing temperature.

In the Swirlmeter, the thermistor is caused to operate in its self-heat region by applying a constant current thereto to heat the thermistor to a temperature above that of the fluid flowing through the meter. For a given fluid velocity, the thermistor is caused by the fluid passing thereby to undergo an appreciable increase in resistance by means of the cooling effect produced by the fluid stream.

Inasmuch as the current applied to the thermistor is maintained constant, an increase in its resistance will be effective as an increase in voltage. Any increase in velocity such as that produced by a fluidic vortex will further cool the thermistor, giving rise to a further increase in voltage. The voltage variations developed in the thermistor circuit as a result of the cyclic variations in local fluid velocity, have a frequency depending on flow rate and constitute the output signal.

The thermistor employed in the sensor probe is of the glass-coated bead type. Since the probe is extended into the meter pipe transversely with respect to the longitudinal axis thereof, the fluid impinging on the exposed glass bead subjects it to bending stresses, and since the glass bead is inherently brittle, the bead may be damaged thereby.

Moreover, in many cases, the fluid being measured contains dirt particles and other abrasive contaminants which impinge on the exposed surface of the glass bead and gradually erode the surface as a result of which the glass bead may fracture after a relatively short period of operation.

Hence even though the Swirlmeter has no moving parts that are subject to wear, its effective life is limited by the life of the thermistor sensor, and should the sensor fail, the meter will be rendered inoperative.

BRIEF DESCRIPTION OF THE INVENTION

In view of the foregoing, it is the main object of the invention to provide a sensor probe and shield assembly for a swirl-type flowmeter which is adapted to capture a sample of the precessing fluid passing through the meter tube and to conduct it to the sensor to render the sensor responsive to the precessional motion, but to otherwise isolate the sensor from the mass of fluid flowing through the meter tube.

More particularly, it is an object of the invention to provide an assembly of the above type in which the sensor is constituted by a glass-coated, bead-type thermistor whose exposed glass surface is protected from particles borne by the fluid conducted through the meter tube and from destructive mechanical stresses, whereby the effective life of the thermistor is prolonged.

Also an object of the invention is to provide a thermistor probe and shield assembly whose sensitivity to the signal component of the fluidic flow is enhanced, thereby improving the signal to noise ratio of the Swirlmeter system.

Briefly stated the objects are attained in a swirl-type flowmeter having a flow tube whose inlet section incorporates a set of swirl blades to impart a swirling motion to incoming fluid, which swirling flow is caused to precess in an enlarged section of the tube. The precessional motion is detected by a thermistor probe and shield assembly to produce voltage pulses whose frequency depends on flow rate, the assembly including a probe extending transversely into the tube and supporting a glass-coated, bead-type thermistor at a point adjacent the inner wall of the tube.

Surrounding the probe and the thermistor is an end portion of an elongated tubular shield whose other end portion has an access port therein oriented to capture a small sample of the precesssing fluid and to conduct it in the direction of the thermistor to a discharge port beyond the thermistor, whereby the thermistor is responsive to precessional motion but is otherwise effectively isolated from the mass of fluid flowing through the tube and from destructive particles borne thereby.

OUTLINE OF THE DRAWING

For a better understanding of the invention as well as other objects and further features thereof, reference is made to the following detailed description to be read in conjunction with the accompanying drawing, wherein:

FIG. 1 is a longitudinal section taken through a swirl-type meter incorporating a thermistor probe and shield assembly in accordance with the invention;

FIG. 2 is an exploded perspective view of the top of the meter;

FIG. 3 schematically shows the assembly installed in the meter; and

FIG. 4 is an enlarged sectional view of the assembly.

DESCRIPTION OF THE INVENTION

Referring now to FIGS. 1 and 2, a Swirlmeter which includes a thermistor probe and shield assembly in accordance with the invention, comprises a meter body constituted by a flow conduit or tube 10 having mounting flanges 11 and 12 at either end thereof to facilitate the interposition of the meter in a line whose fluid is to be metered. The fluid may be any homogeneous fluid or gas.

Flow tube 10 is constituted by a cylindrical inlet section 10A, a cylindrical outlet section 10B, and a Venturi section 10C interconnecting the inlet and outlet sections. Venturi section 10C is formed with a throat entrance region of decreasing cross-sectional area extending downstream from inlet section 10A to a constricted or throat region which leads to a flaring or throat exit region of increasing cross-sectional area communicating with outlet section 10B. Thus the Venturi serves to constrict the flow coming from the inlet section and to expand flow in advance of the outlet section.

Mounted within inlet section 10A is a fixed array of curved swirl blades 13 radiating from a hub 14. To provide a strong signal and a high information rate, the curvature of the swirl blades is made such as to significantly deflect the incoming flow of fluid with respect to the longitudinal axis of flow tube 10.

Thus fluid entering inlet section 10A is forced by the array of swirl blades to assume a swirling motion, the swirling fluid being directed into Venturi section 10C. In the flaring exit region of the Venturi where the increasing area gives rise to fluid expansion, the swirling flow is converted into precessional motion about the longitudinal axis of the tube. The frequency of precession depends on the volumetric flow rate. To straighten out the flow leaving the meter, a set of planar de-swirl blades 15 extending radially from a hub 16, is fixedly disposed in the outlet section 10B.

Cyclic variations in local fluid velocity, as a result of the precessional motion, are detected by a sensor probe and shield assembly generally indicated by numeral 17 and constituted by a probe 18 which extends into Venturi section 10C at right angles to the longitudinal axis thereof and terminates in a bead-type thermistor 19 whose resistance value is varied periodically in response to temperature changes produced by the precessing fluid.

Voltage pulses are derived from the thermistor through wires passing through probe 18, these pulses being amplified and filtered, and being converted into square-wave pulses of constant amplitude. The frequency of the square-wave pulses may be measured by a conventional electronic counter, or the signals generated by the meter may be processed by other digital readout or control instrumentation.

The electronic circuits operating in conjunction with sensor probe assembly 17 are contained in a casing 20 mounted on the meter body. The electronic circuits are not the concern of the present invention, and are mentioned only in order to explain the behavior of the Swirlmeter and how flow is converted into digital values.

Fitting over and protectively surrounding the probe and thermistor is the upper end portion of an elongated tubular shield 21 whose lower end is closed and is provided with an axially projecting nipple 22. Nipple 22 is received in an indentation 23 formed in the wall of Venturi section 10C at a point diametrically opposed to the bore in the tube through which the probe is inserted. The purpose of the indentation and nipple combination is physically to stabilize the shield in order to prevent flutter of the assembly when subjected to the precessing fluidic stream. A similar result is achievable by passing a bolt through the wall of the tube, which bolt is threadably received in the lower end of the shield.

The probe, thermistor and shield assembly is held in place within the meter body by means of a flanged retainer ring 24 which is fastened onto a cylindrical boss 25 formed on the meter tube by suitable screws. A Belleville washer 26 is interposed between retainer ring 24 and boss 25 to maintain loading of the assembly over a wide temperature range.

Formed in the lower end section of the shield at a position displaced about 90 degrees from the direction of flow down the tube, is an access port 27 which in practice, may be in round or in slot form or any other suitable forms. Access port 27 functions to admit a sample of the precessing fluid into the shield to produce an oscillating sample stream which flows upwardly in the shield in the direction of thermistor 19 and therebeyond for exhaust through a discharge port 28 formed in the upper portion of the shield. Discharge port 28 is oriented to exhaust the sample stream in the downstream direction.

Placed within shield 21 at a divergent point therein in the upward path of the sample stream in advance of thermistor 19, is a constriction or baffle 29 which is adapted to focus and concentrate the sample stream onto the effective surface of the thermistor to maximize the effect thereof.

Thus the thermistor is no longer a standard arrangement, exposed to the full brunt of the main stream passing through the meter, but only to an oscillating sample stream. In this way, the thermistor is protected from abrasive contaminants in the fluid and from the substantial bending stresses produced by the fluid.

Because the velocity of the sampling stream impinging on the thermistor is far less than that of the main stream, the resultant reduction in the magnitude of fluid forces imposed on the thermistor obviates damage thereto by reason of these forces. Moreover, the direction of the sample stream relative to the thermistor, as against the direction of the main stream in the conventional arrangement is such as to produce compressive rather than shearing stresses in the glass-covered thermistor. Since glass has high strength with respect to compressive forces imposed thereon, the glass is not damaged in any way by the sample stream.

The present arrangement, since it extracts from the main stream an oscillatory sample stream, emphasizes the signal component and plays down all other voltage-producing components generated in the main stream, thereby improving the signal-to-noise ratio of the system. Moreover because the sample stream is focused onto the thermistor, there is effected a marked reduction in hydraulic noise due to flow separation over the thermistor glass.

It must be borne in mind that in a swirlmeter, the precessing fluid creates cyclic variations in local transport properties, such as velocity, pressure, temperature or the like. The shield, in accordance with the invention, constitutes a passage extending transversely with respect to the longitudinal axis of the meter conduit, which passage provides a connection between points located on either side of this axis, so that cyclic variations are alternately present at each end of the passage. The sensor disposed in the shield or passage need not, therefore, be a thermistor, but may be a fluidic amplifier to amplify the fluidic variations present within the passage, or it may be a pressure transducer or any other sensor responsive to a varying property encountered in the passage.

While there has been shown and described a preferred embodiment of a sensor probe and shield assembly for a swirl-type flowmeter in accordance with the invention, it will be appreciated that many changes and modifications may be made therein without, however, departing from the essential spirit of the invention.

I claim:

1. In a swirl-type flowmeter provided with a flow conduit having means disposed in the inlet section thereof to impart a swirling motion to fluid admitted therein, the swirling fluid being caused to precess in an enlarged section of the conduit to create cyclic variations in local transport properties, such as variations in velocity or pressure, a tube disposed in said conduit to define a relatively narrow passage extending transversely with respect to the longitudinal axis of the conduit, said tube communicating with points in said conduit located on opposite sides of said axis at which cyclic variations are alternately present, and a sensor disposed within said tube at a position intermediate said points, said sensor being adapted to amplify or transduce said variations.

2. In a swirl-type flowmeter provided with a flow tube having swirl blades disposed in the inlet section thereof to impart a swirling motion to fluid admitted thereto, the swirling fluid being caused to precess in an enlarged section of the tube to create cyclic variations in local fluid velocity, temperature and pressure; a sensor assembly disposed in said tube to amplify the fluidic variations or convert them into electrical variations, said assembly comprising:
   A. a probe mounted on the wall of said tube and projecting transversely therein,
   B. a sensor mounted on the free end of the probe, and
   C. an elongated tubular shield, transversely disposed in said tube, the upper end portion of said shield enclosing both said probe and said sensor, said shield having ports both above and below the sensor located so that the passage of the vortex core around the circumference of the tube creates an alternating pressure at said ports and a corresponding oscillating flow in said shield, whereby said sensor is actuated.

3. An assembly as set forth in claim 2, wherein said sensor is a glass-coated, bead-type thermistor.

4. An assembly as set forth in claim 3, further including a baffle disposed in said shield to focus the sample stream on the thermistor.

5. An assembly as set forth in claim 2, wherein the axes of said ports are at 90° to 270° with respect to the mean velocity direction.

6. An assembly as set forth in claim 2, further including means attachable to the lower end of said shield to stabilize same.

7. An assembly as set forth in claim 6, wherein said stabilizing means is constituted by a nipple attached to the lower end of the shield and received in an indentation in the wall of the tube.

* * * * *